United States Patent
Lin et al.

(10) Patent No.: US 10,896,004 B2
(45) Date of Patent: *Jan. 19, 2021

(54) DATA STORAGE DEVICE AND CONTROL METHOD FOR NON-VOLATILE MEMORY, WITH SHARED ACTIVE BLOCK FOR WRITING COMMANDS AND INTERNAL DATA COLLECTION

(71) Applicant: Silicon Motion, Inc., Jhubei (TW)

(72) Inventors: Ting-Han Lin, Zhubei (TW); Che-Wei Hsu, Taichung (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,264

(22) Filed: Jul. 8, 2019

(65) Prior Publication Data

US 2020/0081657 A1    Mar. 12, 2020

Related U.S. Application Data

(60) Provisional application No. 62/728,134, filed on Sep. 7, 2018.

(30) Foreign Application Priority Data

Feb. 26, 2019   (TW) .............................. 108106466 A (51) Int. Cl.
*G06F 13/00*   (2006.01)
*G06F 3/06*    (2006.01)

(52) U.S. Cl.
CPC .......... *G06F 3/0659* (2013.01); *G06F 3/0604* (2013.01); *G06F 3/064* (2013.01); *G06F 3/0647* (2013.01); *G06F 3/0679* (2013.01)

(58) Field of Classification Search
CPC .... G06F 3/0659; G06F 3/0604; G06F 3/0679; G06F 3/0647; G06F 3/064; G06F 3/0658; G06F 3/0626
See application file for complete search history.

(56) References Cited

U.S. PATENT DOCUMENTS 7,609,564 B2* 10/2009 Blum ................... G06F 12/0246
                                                365/189.011
8,040,744 B2* 10/2011 Gorobets ............ G06F 12/0246
                                                365/200
(Continued)

FOREIGN PATENT DOCUMENTS

CN    101645309 A    5/2013
CN    104732153 A    6/2015
(Continued)

OTHER PUBLICATIONS

Non-Final Office Action dated Aug. 25, 2020, issued in U.S. Appl. No. US 16/505,192 (copy not provided).

*Primary Examiner* — Jing-Yih Shyu
(74) *Attorney, Agent, or Firm* — McClure, Qualey & Rodack, LLP (57) ABSTRACT

High-efficiency control technology for non-volatile memory. A controller allocates spare blocks of a non-volatile memory to provide an active block and writes data issued by a host to the active block. The controller further uses the active block as the destination for data transferred from a first source block when there are fewer spare blocks than the threshold amount. When a second source block meets the transfer requirements, the controller uses the active block as the destination for data transferred from the second source block.

18 Claims, 4 Drawing Sheets

(56) References Cited

U.S. PATENT DOCUMENTS

| | | | |
|---|---|---|---|
| 8,205,036 B2 | 6/2012 | Chen et al. | |
| 8,225,028 B2* | 7/2012 | Kuo | G06F 12/0246 |
| | | | 711/103 |
| 8,356,136 B2* | 1/2013 | Chang | G06F 12/0246 |
| | | | 711/103 |
| 8,667,210 B2* | 3/2014 | Yeh | G06F 12/0246 |
| | | | 711/103 |
| 8,886,990 B2* | 11/2014 | Meir | G06F 12/0246 |
| | | | 714/6.1 |
| 9,021,177 B2* | 4/2015 | Segal | G06F 12/0246 |
| | | | 711/103 |
| 9,747,201 B2* | 8/2017 | Nguyen Tien | G06F 12/0246 |
| 2006/0155920 A1 | 7/2006 | Smith et al. | |
| 2006/0161722 A1* | 7/2006 | Bennett | G06F 12/0246 |
| | | | 711/103 |
| 2007/0168632 A1* | 7/2007 | Zeevi | G06F 12/0246 |
| | | | 711/165 |
| 2007/0234183 A1* | 10/2007 | Hwang | G11C 29/42 |
| | | | 714/763 |
| 2012/0084490 A1* | 4/2012 | Choi | G11C 16/3418 |
| | | | 711/103 |
| 2012/0159051 A1 | 6/2012 | Hida et al. | |
| 2013/0173875 A1 | 7/2013 | Kim et al. | |
| 2016/0078966 A1* | 3/2016 | Li | G11C 16/349 |
| | | | 714/723 |
| 2016/0188455 A1* | 6/2016 | Patel | G06F 12/0246 |
| | | | 711/154 |
| 2017/0199703 A1* | 7/2017 | Ravimohan | G06F 3/0659 |
| 2017/0221584 A1 | 8/2017 | Chen et al. | |
| 2018/0150390 A1 | 5/2018 | Chien et al. | |
| 2018/0165009 A1 | 6/2018 | Hsiao et al. | |
| 2018/0275887 A1 | 9/2018 | Yang et al. | |
| 2019/0108119 A1* | 4/2019 | Gholamipour | G11C 16/349 |

FOREIGN PATENT DOCUMENTS

| | | |
|---|---|---|
| CN | 107817943 A | 3/2018 |
| TW | I604441 B | 11/2017 |
| TW | I613652 B | 2/2018 |
| TW | I615710 B | 2/2018 |
| TW | I627531 B | 6/2018 |

* cited by examiner

DATA STORAGE DEVICE AND CONTROL METHOD FOR NON-VOLATILE MEMORY, WITH SHARED ACTIVE BLOCK FOR WRITING COMMANDS AND INTERNAL DATA COLLECTION

CROSS REFERENCE TO RELATED APPLICATIONS

This Application claims the benefit of U.S. Provisional Application No. 62/728,134, filed on Sep. 7, 2018, the entirety of which is incorporated by reference herein.

This Application also claims priority of Taiwan Patent Application No. 108106466, filed on Feb. 26, 2019, the entirety of which is incorporated by reference herein.

BACKGROUND OF THE INVENTION

Field of the Invention

The present invention relates to control techniques for non-volatile memory.

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as the storage medium in a data storage device.

Non-volatile memory typically has its own specific storage characteristics. There is a need in the art for the development of control techniques for the specific storage characteristics of non-volatile memory.

BRIEF SUMMARY OF THE INVENTION

In accordance with an exemplary embodiment of the disclosure, a data storage device has a non-volatile memory and a controller. The controller allocates spare blocks of the non-volatile memory to provide an active block and writes data issued by the host to the active block. The controller further uses the active block as the destination for data transferred from a first source block when there are fewer spare blocks than the threshold amount. When a second source block meets the transfer requirements, the controller uses the active block as the destination for data transferred from the second source block.

In an exemplary embodiment, the controller permits data to be transferred from a later source block to the active block after finishing the data transfer from an earlier source block to the active block.

In an exemplary embodiment, the controller performs a data transfer from a source block to the active block in sections. Between different sections of the data transfer, the controller permits data issued by the host to be written to the active block.

In an exemplary embodiment, the controller estimates the ratio of valid data size within the source block to spare space in the active block. According to the ratio, the controller sets a data-transfer amount in each section of the data transfer. According to the ratio, the controller may further set a writing amount between the different sections of the data transfer for the host to write data to the active block In an exemplary embodiment, the controller estimates the ratio of valid data within the source block to write data requested by the host. According to the ratio, the controller sets a data-transfer amount in each section of the data transfer.

In an exemplary embodiment, the second source block meets the transfer requirements when there is a failure in error checking and correction.

In an exemplary embodiment, the second source block meets the transfer requirements when an early move is needed.

In an exemplary embodiment, the second source block meets the transfer requirements when selected for wear leveling.

In an exemplary embodiment, prior to closing the active block, the controller releases a source block whose valid data has been completely transferred to the active block.

In an exemplary embodiment, after transferring all valid data from a source block to the active block, the controller uses a flag to permit the transfer of valid data from another source block to the active block.

In addition to a controller, the control of a non-volatile memory may be implemented by other structures. In an exemplary embodiment, a control method for non-volatile memory may be realized according to the aforementioned concepts, which includes the following steps: operating a non-volatile memory as requested by a host; allocating spare blocks of the non-volatile memory to provide an active block and writing data issued by the host to the active block; further using the active block as the destination for data transferred from a first source block when there are fewer spare blocks than the threshold amount; and when a second source block meets the transfer requirements, using the active block as the destination for data transferred from the second source block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
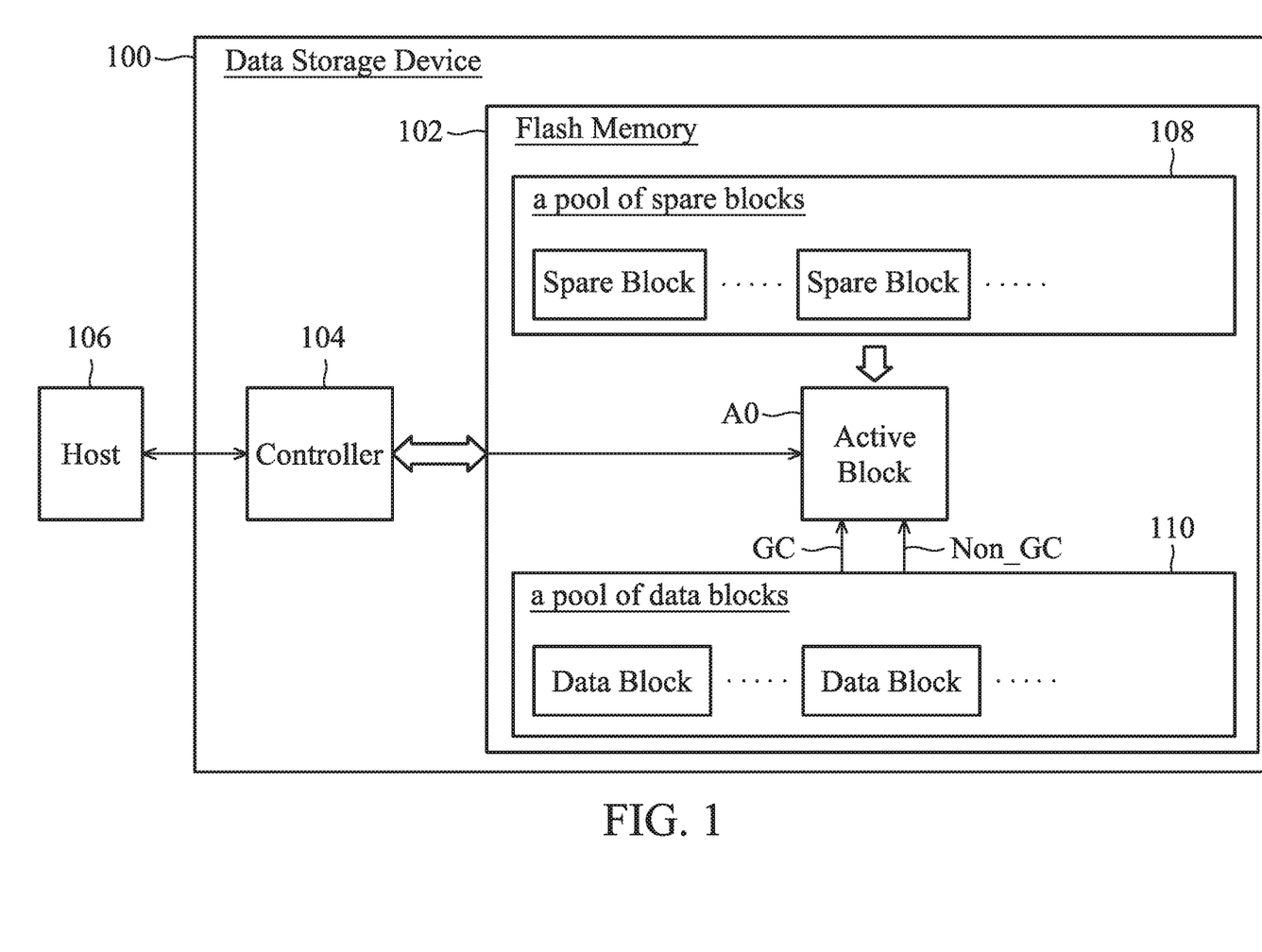
FIG. 1 is a block diagram depicting a data storage device 100 in accordance with an exemplary embodiment of the disclosure

FIG. 1 is a block diagram depicting a data storage device 100 in accordance with an exemplary embodiment of the disclosure. The data storage device 100 includes a flash memory 102 and a controller 104. A host 106 accesses the flash memory 102 through the controller 104. The controller 104 receives and executes write commands from the host 106. To optimize the storage of the flash memory 102, the controller 104 further involves user data transfer within the flash memory 102 without commands from the host 106.

A flash memory has its special storage characteristics, as described below.

The host 106 distinguishes user data by logical address (e.g., logical block address LBA or global host page number GHP . . . etc.). The physical space in the flash memory 102 is divided into a plurality of blocks. Each block includes a plurality of pages. Each page includes N sectors, where N is an integer greater than 1, such as: 4. A 16 KB page may be divided into four sectors, each sector is 4 KB. In an exemplary embodiment, a block is allocated from a low to high page number to store user data.

In an exemplary embodiment, a data storage device adopts a multi-channel accessing technology. Blocks accessed through different channels may be managed as one super block, and pages of the different blocks may be managed as one super page. The data storage device managed in the units of super block (or super page) therefore has improved data throughput.

For storage of user data, the data storage device records the mapping between logical address of the user data and physical address storing the user data in a logical-to-physical mapping table (L2P Table).

The storage space in the flash memory needs to be erased before being allocated again to store data. The minimum unit of erasure is a block. There are data blocks, active blocks, and spare blocks. An active block may be selected from the spare blocks to store user data. When full, the active block is closed (e.g., by writing of EOB (end of block) information) and changed to a data block. As the user data is updated, old user data in the data blocks are invalidated. When only invalid data remains, a data block is erased and changed to a spare block. In another exemplary embodiment, the block erasure is performed later. A block in which only invalid data remains is first changed to a spare block and is erased when selected to serve as an active block.

The control of a flash memory involves data transfer between blocks, including data transfer for garbage collection and data transfer for purposes other than garbage collection. When the number of spare blocks is insufficient, garbage collection is required. In an exemplary embodiment, sparse pieces of valid data that remain in the blocks (called source blocks) may be collected in an active block (called a destination block). After garbage collection, source blocks are released, thereby increasing the number of spare blocks.

Data transfer for purposes other than garbage collection may be performed when there is a transfer requirement. In an exemplary embodiment, a data block containing ECC (error checking and correction) failed data may be regarded as a source block and the readable data is rescued and transferred to another block. In an exemplary embodiment, a data block read too frequently may be also regarded as a source block. Because the frequent reading may damage the data retention capability of a data block, an early move action is required to transfer data to another block. In an exemplary embodiment, data transfer may be performed because of wear leveling. For example, a block with a low read count may be regarded as a source block. Data in the source block may be moved to an active block (i.e. a destination block) that has a high erase count, thereby releasing rather than freezing the rarely used source block. In an exemplary embodiment, the concept of wear leveling is combined with garbage collection. Based on the wear leveling concept, valid data scattered on the source blocks is moved to an active block (destination block) having a high erase count.

It should be noted that the data transfer is preferably implemented by copying data to the destination.

In FIG. 1, the flash memory 102 has a pool 108 of spare blocks and a pool 110 of data blocks. When a host 106 issues a write command or the controller 104 initiates a data transfer procedure, the controller 104 selects one spare block from the spare block pool 108 as an active block A0, and the number of spare blocks is reduced by one. User data is written/transferred to the active block A0. When the active block A0 is closed and becomes a data block, the number of data blocks is increased by one.

A high-efficiency data storage technique is proposed in the disclosure for different storage purposes. In addition to storing user data issued by the host 106 (e.g. requested by the host 106 through write commands to write user data to the flash memory 102), the data storage technique may further involve the transfer of user data obtained from a source block. This data transfer may occur due to garbage collection, ECC failure, early move, wear leveling, and so on.

The controller 104 typically uses an active block A0 to receive user data issued by the host 106. The host 106 typically uses a write command to issue user data. Instead of additionally using another active block A1 (which is distinguished from active block A0) to store user data obtained from a source block for data transfer, the controller 104 also regards the active block A0 as the destination for the data transfer. When a request for a data transfer (e.g., due to garbage collection, ECC failure, early move, wear leveling, and so on) occurs, user data obtained from a source block is collected in the active block A0. Compared with conventional technology which uses the active block A0 and the active block A1 to separate user data issued by the host 106 from the transferred user data, the design of the disclosure has several advantages and is described below.

First, in the disclosure, the active block A0 not only stores user data issued by the host 106 through a write command, but it also stores user data transferred from a source block, which saves space in the spare blocks.

In a conventional example of using an active block A1 to deal with a sudden power failure, the active block A1 is abandoned during a sudden power-off recovery (SPOR) procedure for data reliability. Source blocks are accessed during the SPOR procedure to provide reliable user data. Therefore, as long as the active block A1 has not been closed, all source blocks of the data transfer must be retained and cannot be released. The aforementioned design obviously drags down the recycling of source blocks. The number of spare blocks cannot be increased over time. Other types of data transfer may be induced.

Compared with conventional technology, the disclosure uses the active block A0 as the destination block for the data transfer. The active block A0 is not discarded during the SPOR procedure. There is no need to maintain the source blocks and the source blocks are released right after the data transfer. Therefore, compared with conventional technology in which the active block A1 is required as the destination block for the data transfer, the disclosure effectively increases the number of spare blocks.

According to the prior art, dummy data is filled to the active block A1 (that works as the destination block for the data transfer) to close the active block A1 early. The data storage capacity, therefore, is reduced. The erasure frequency is increased, which shorten the life of flash memory. To deal with this problem, the active block A0 is used as the destination block of data transfer in the disclosure, which avoids the writing of dummy data.

In an exemplary embodiment, the controller 104 must finish transferring valid data from the earlier source block to the active block A0 before transferring valid data from the later source block to the active block A0. The data transfer may be performed due to garbage collection or other purposes.

As mentioned above, the data transfer may be due to garbage collection or other purposes. When the number of spare blocks is less than the threshold number TH1, the controller 104 starts the garbage collection process and uses the active block A0 as the destination block. As shown, the garbage collection path is GC.

As for data transfers that are performed for purposes (such as ECC failure, early move, wear leveling procedures, etc.) other than garbage collection, the controller 104 also uses the active block A0 as the destination block. As shown, path Non_GC is established for data transfers that are performed for purposes other than garbage collection.

In an exemplary embodiment, the active block A0 for storage of user data issued by the host 106 also serves as a destination block for garbage collection. When the active block A0 has not been closed after storing the user data issued by the host 106, the active block A0 may be used as a destination block for garbage collection to store user data obtained from a source block, e.g., BLK #0. When all the valid data from the source block BLK #0 has been transferred, the source block BLK #0 may be released as a spare block without waiting for the active block A0 to be closed.

In an exemplary embodiment, the active block A0 for storage of user data issued by the host 106 also serves as a destination block for data transfers that are performed for purposes other than garbage collection. When the active block A0 has not been closed after storing the user data issued by the host 106, the active block A0 may be used as a destination block for data transfers that are performed for purposes other than garbage collection. User data obtained from a source block, e.g., BLK #1 is transferred to the active block A0. When all the valid data from the source block BLK #1 has been transferred, the source block BLK #1 may be released as a spare block without waiting for the active block A0 to be closed.

In an exemplary embodiment, the active block A0 for storage of user data issued by the host 106 also serves as a destination block no matter the data transfer is due to garbage collection or not. When the active block A0 has not been closed after storing the user data issued by the host 106, the active block A0 may be used as the destination block for the data transfer. The data transfer may be caused by garbage collection to store user data obtained from a source block, e.g., BLK #0, or it may be performed for another purpose (other than garbage collection) to store user data obtained from a source block, e.g., BLK #1. When all the valid data from the source block BLK #0/BLK #1 has been transferred, the source block BLK #0/BLK #1 may be released as spare blocks without waiting for the active block A0 to be closed.

In an exemplary embodiment, the user data issued by the host 106 and the user data transferred due to garbage collection and other purposes are preferably segmented into sections and written to the active block A0 in an interleaving way. The different sections of user data may have equal size (according to a preset writing amount and a preset transferring amount). In another exemplary embodiment, the segmenting is based on a timer (according to a preset writing interval and a preset transferring interval). The different sections of user data issued by the host 106 are inserted between the writing of the different sections of user data transferred from a source block.

In an exemplary embodiment, the controller 104 estimates the ratio of valid data within the source block to write data requested by the host 106. According to the ratio, the controller 104 sets a data-transfer amount in each section of the data transfer, and sets a data amount for writing, between the different sections of the data transfer, data issued by the host 106 to the active block A0. In another exemplary embodiment, the controller 104 estimates the ratio of valid data size within the source block to spare space in the active block A0. According to the ratio, the controller 104 sets a data-transfer amount in each section of the data transfer, and sets a data amount for writing, between the different sections of the data transfer, data issued by the host 106 to the active block A0.

Figure 2A:
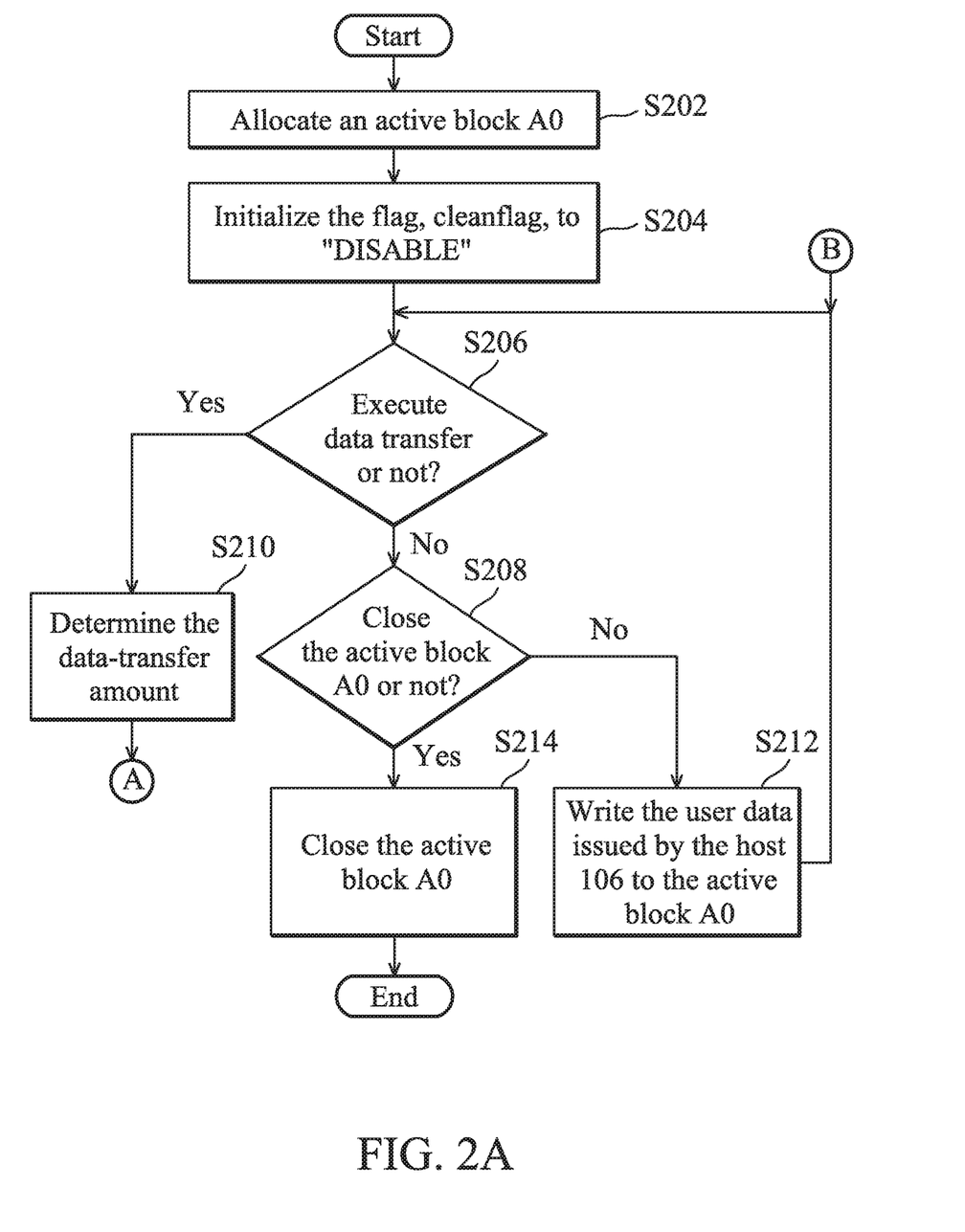
FIGS. 2A and 2B show a flowchart illustrating a high-performance data storage method implemented in accordance with an exemplary embodiment of the present invention, wherein a flag, cleanflag, is utilized to control the data transfer.
Figure 2B:
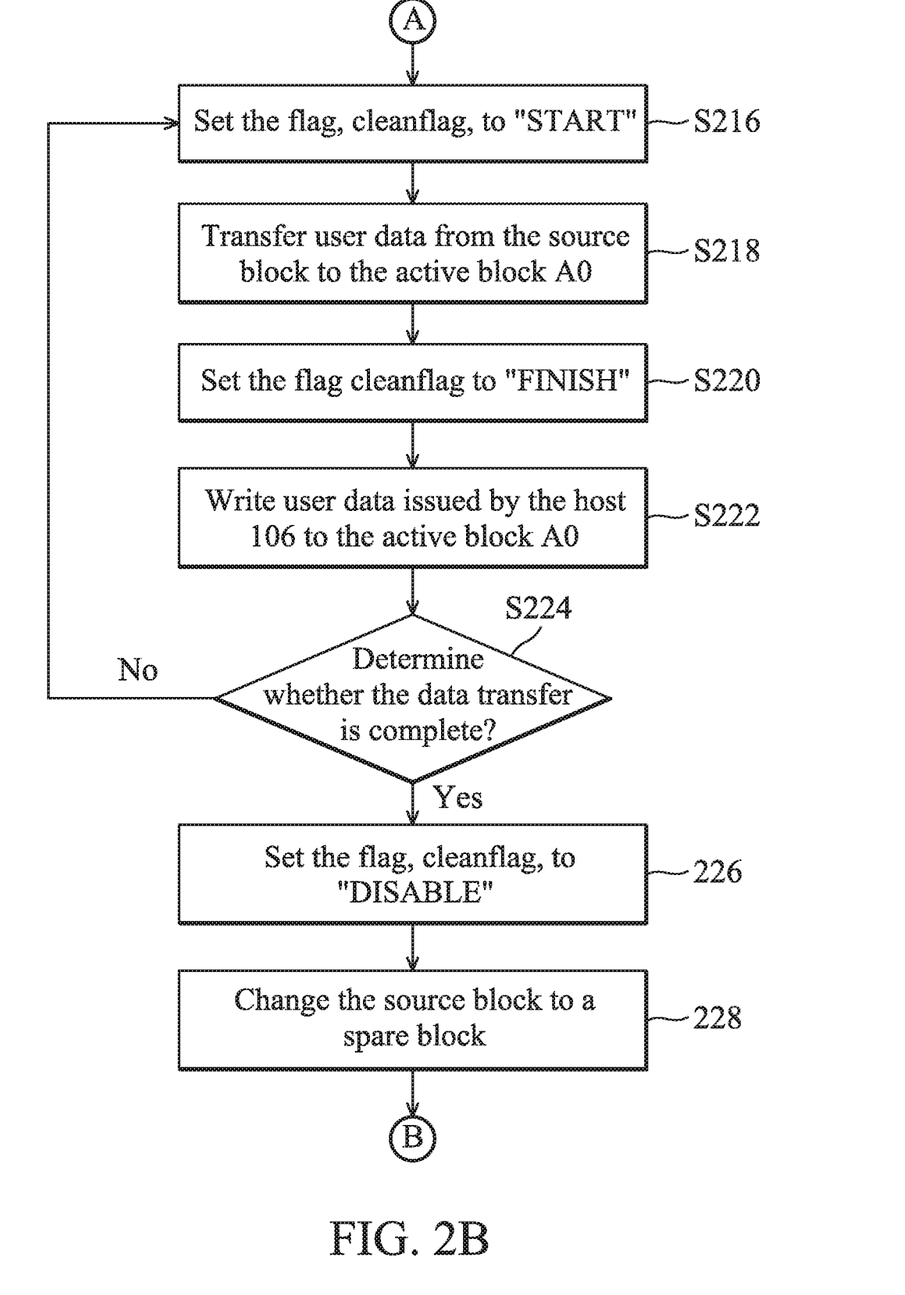

FIGS. 2A and 2B show a flowchart illustrating a high-performance data storage method implemented in accordance with an exemplary embodiment of the present invention, wherein a flag cleanflag is utilized to control the data transfer.

In step S202, the controller 104 allocates an active block A0. The controller 104 selects one spare block from the pool 108 of spare blocks as the active block A0.

In step S204, the controller 104 initializes the flag cleanflag to "DISABLE". According to the "DISABLE" state, the active block A0 is not only used to store data issued by the host 106 and is permitted to be a destination block for data transfers.

In step S206, the controller 104 determines whether to execute data transfer or not. If yes, step S210 is performed, and if not, step S208 is performed. The controller 104 starts (executes) data transfer when a preset condition is satisfied. For example, the preset condition is judged by determining whether the number of spare blocks is less than a threshold number TH1, or whether an error correction failure occurs.

In step S208, the controller 104 determines whether to close the active block A0 or not. If yes, step S214 is performed, and if not, step S212 is performed. When the active block A0 still has spare space to store data, the controller 104 does not close the active block A0.

In step S212, the controller 104 writes the user data issued by the host 106 to the active block A0, and then returns to step S206. According to the procedure of FIG. 2A, the controller 104 first executes step S206, and then executes step S208 and step S212, which means according to the controller 104 the data transfer is in a higher priority than the writing of user data issued by the host 106. In another exemplary embodiment, the controller 104 performs step S208 and step S212 prior to performing step S206, which means that the writing of user data issued by the host 106 is in a higher priority than the data transfer from the source block to the active block A0.

In step S214, the controller 104 closes the active block A0. When the active block A0 has no spare space for data storage, the controller 104 closes the active block A0 and writes EOB information to the last page of the active block A0.

In step S210, the controller 104 determines the data-transfer amount, which may be a fixed value. In an exemplary embodiment, the fixed data-transfer amount depends on the ratio of valid data within the source block to write data requested by the host 106. In another exemplary embodiment, the fixed data-transfer amount depends on the ratio of valid data size within the source block to spare space in the active block A0. The source block used in the data transfer may be selected for garbage collection or other purposes. The data-transfer amount may be the total amount of valid data within the source block.

In step S216, the controller 104 sets the flag cleanflag to "START" to start using the active block A0 as the destination block for a data transfer. "START" shows that the controller 104 is ready to perform data transfer.

Figure 3:
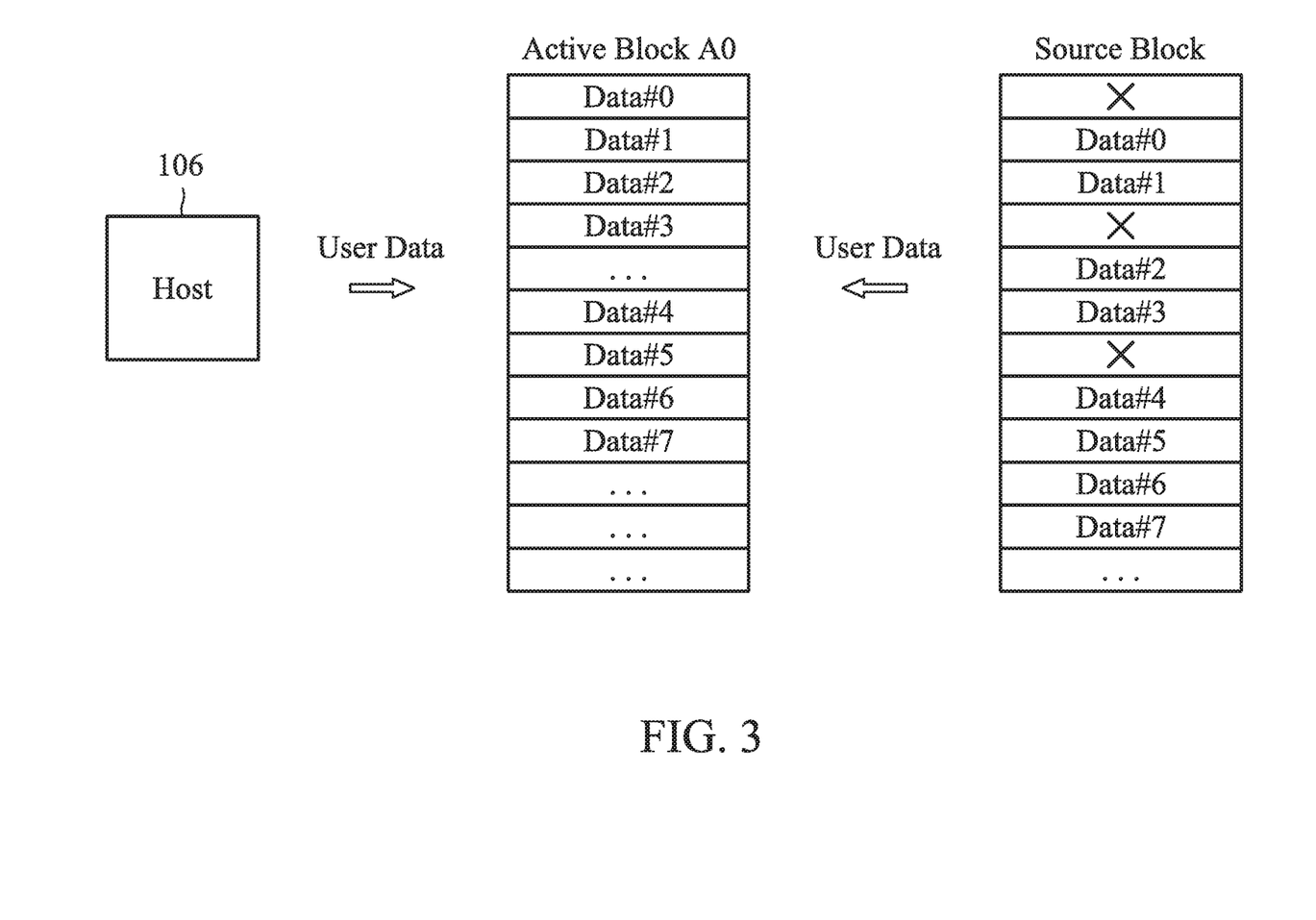
FIG. 3 depicts an example of the transfer of data from a source block to a destination in sections with inserted writing issued by the host.

In step S218, the controller 104 transfers user data from the source block to the active block A0. The controller 104 may transfer user data from the source block to the active block A0 at one time or in sections. In an exemplary embodiment, the amount of user data in the source block is x units, and the amount of user data issued by the host 106 is n*x units. A ratio, 1:n is obtained. In the following discussion, x is 16, and n is 10. The controller 104 may transfer the M units of user data to the active block A0 in each section, where M, for example, is 4. FIG. 3 illustrates an example of segmented data transfer. After user data Data #0 . . . Data #3 is transferred to the active block A0, the host 106 writes user data to the active block A0, and then user data Data #4 . . . Data #7 is transferred to the active block A0. In the similar manner, the remaining eight units of user data are moved from the source block to the active block A0 in two sections. In another exemplary embodiment, the data transfer is performed without being interrupted by the writing of user data issued by the host 106, and the controller 104 transfers all 16 sectors of user data to the active block A0 at one time. The number M of data transfers in each section is preferably a multiple of the number of sectors, and may cover one or more pages. For example, the controller 104 may write one page at a time. M=4. Four sectors forming one page are transferred together. In an exemplary embodiment, the controller 104 writes the data one super page at a time, M=16.

In step S220, the controller 104 sets the flag cleanflag to "FINISH" to indicate that the data transfer, in which the data was transferred at one time or in sections, has been completed.

In step S222, the controller 104 writes user data issued by the host 106 to the active block A0. After the step of transferring data, the controller 104 regards the host 106 as the source of data. The controller 104 writes user data issued by the host 106 to the active block A0. The controller 104 may write a fixed amount of user data to the active block A0 in this step. For example, the fixed data amount may depend on the aforementioned ratio 1:n. The fixed data amount may be 40 units, which is a product of n and M, where n is 10 and M is 4.

In step S224, the controller 104 determines whether the data transfer is complete. If yes, step S226 is performed, and if not, step S216 is performed. The controller 104 repeats steps S216 to S224 to move user data from the source block to the active block A0 in sections. For example, the number of repetitions is 4 when there are 16 units of user data and 4 units of user data are transferred in each section of data transfer.

In step S226, the controller 104 sets the flag cleanflag to "DISABLE".

In step S228, the controller 104 changes the source block to a spare block. In this step, the number of spare blocks is increased by one. According to step S228, the number of spare blocks increases over time without waiting for the active block A0 to close.

In any of steps S212, S214, S218, or S222, the controller 104 may update the logical-to-physical address mapping table with the writing of the active block A0. In an exemplary embodiment, the controller 104 generates a physical-to-logical mapping table (a small table) for the active block A0, and then updates a logical-to-physical mapping table (a large table) based on the physical-to-logical mapping table.

In an embodiment, step S222 may count time. When the time limit is exceeded in step S222, the flowchart proceeds to step S224.

In an exemplary embodiment, the data amount of segmented data transfer (S218) and the data amount of segmented data writing (S222) may depend on the ratio of valid data size within the source block to spare space in the active block A0. When the active block A0 has only a small spare area and the source block has a large amount of valid data, the controller 104 increases the data amount of the segmented data transfer (S218), or/and limits the data amount of the segmented writing (S222) of user data issued by the host 106. In this manner, it is guaranteed that a source block will be completely transferred before the active block A0 is closed.

The user may be in the habit of repeatedly powering down and up a device (referred to as power cycling). For example, a mobile phone user may flip the phone cover to check messages. A lot of spare blocks are consumed in power cycling. A need for garbage collection arises. Some blocks are read repeatedly. A need for data transfer, e.g., due to ECC failure, early move, wear leveling, and so on, may arise. According to the disclosure, the number of spare blocks increases over time.

The operations that the controller 104 performs on the flash memory 102 may be implemented by other structures. Any case that performs a data transfer without further allocating an active block A1 should be considered as within the scope of the present invention. In this case, the control method of the non-volatile memory can be realized by the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, operating the non-volatile memory as requested by a host,
wherein:
the controller allocates spare blocks of the non-volatile memory to provide an active block and writes data issued by the host to the active block;
the controller further uses the active block as a destination for a data transfer from a first source block when there are fewer spare blocks than a threshold amount;
when a second source block meets transfer requirements, the controller uses the active block as a destination for a data transfer from the second source block,
the controller permits a data transfer from a later source block to the active block after finishing a data transfer from an earlier source block to the active block, and
after transferring all valid data from the earlier source block to the active block, the controller uses a flag to permit transferring valid data from the later source block to the active block.

2. The data storage device as claimed in claim 1, wherein:
the controller performs a data transfer from a source block to the active block in sections; and
between different sections of the data transfer, the controller permits the host to write data into the active block.

3. The data storage device as claimed in claim 2, wherein:
the controller estimates a ratio of valid data size within the source block to spare space in the active block; and
according to the ratio, the controller sets a data-transfer amount in each section of the data transfer.

4. The data storage device as claimed in claim 3, wherein:
according to the ratio, the controller sets a writing amount between the different sections of the data transfer for the host to write data to the active block.

5. The data storage device as claimed in claim 2, wherein:
the controller estimates a ratio of valid data within the source block to write data requested by the host; and
according to the ratio, the controller sets a data-transfer amount in each section of the data transfer.

6. The data storage device as claimed in claim 1, wherein:
the second source block meets the transfer requirements when there is a failure in error checking and correction.

7. The data storage device as claimed in claim 1, wherein:
the second source block meets the transfer requirements when an early move is needed.

8. The data storage device as claimed in claim 1, wherein:
the second source block meets the transfer requirements when selected for wear leveling.

9. The data storage device as claimed in claim 1, wherein:
prior to closing the active block, the controller releases the first or second source block having finished data transfer.

10. A non-volatile memory control method, comprising:
operating a non-volatile memory as requested by a host;
allocating spare blocks of the non-volatile memory to provide an active block and writing data issued by the host to the active block;
further using the active block as a destination for data transferred from a first source block when there are fewer spare blocks than a threshold amount;
when a second source block meets the transfer requirements, using the active block as a destination for data transferred from the second source block,
permitting data to be transferred from a later source block to the active block after finishing a data transfer from an earlier source block to the active block; and
after transferring all valid data from the earlier source block to the active block, using a flag to permit transferring valid data from the later source block to the active block.

11. The non-volatile memory control method as claimed in claim 10, further comprising:
performing a data transfer from a source block to the active block in sections; and
between different sections of the data transfer, permitting data issued by the host to be written to the active block.

12. The non-volatile memory control method as claimed in claim 11, further comprising:
estimating a ratio of valid data size within the source block to spare space in the active block; and
according to the ratio, setting a data-transfer amount in each section of the data transfer.

13. The non-volatile memory control method as claimed in claim 12, further comprising:
according to the ratio, setting a writing amount between the different sections of the data transfer for the host to write data to the active block.

14. The non-volatile memory control method as claimed in claim 11, further comprising:
estimating a ratio of valid data within the source block to write data requested by the host; and
according to the ratio, setting a data-transfer amount in each section of the data transfer.

15. The non-volatile memory control method as claimed in claim 10, wherein:
the second source block meets the transfer requirements when there is a failure in error checking and correction.

16. The non-volatile memory control method as claimed in claim 10, wherein:
the second source block meets the transfer requirements when an early move is needed.

17. The non-volatile memory control method as claimed in claim 10, wherein:
the second source block meets the transfer requirements when selected for wear leveling.

18. The non-volatile memory control method as claimed in claim 10, further comprising:
prior to closing the active block, releasing the first or second source block having finished data transfer.

* * * * *